United States Patent
Martinez (10) Patent No.: US 11,511,697 B2
(45) Date of Patent: Nov. 29, 2022

(54) VEHICLE BODY STRUCTURE

(71) Applicant: Nissan North America, Inc., Franklin, TN (US)

(72) Inventor: Alejandro Martinez, Toluca (MX)

(73) Assignee: NISSAN NORTH AMERICA, INC., Franklin, TN (US)

(*) Notice: Subject to any disclaimer, the term of this patent is extended or adjusted under 35 U.S.C. 154(b) by 416 days.

(21) Appl. No.: 16/722,728

(22) Filed: Dec. 20, 2019

(65) Prior Publication Data

US 2021/0188206 A1 Jun. 24, 2021

(51) Int. Cl.
- *B60R 21/21* (2011.01)
- *B62D 25/02* (2006.01)
- *B62D 25/20* (2006.01)

(52) U.S. Cl.
CPC .......... *B60R 21/21* (2013.01); *B62D 25/025* (2013.01); *B62D 25/20* (2013.01)

(58) Field of Classification Search
CPC ..... B60R 21/21; B60R 21/207; B62D 25/025; B60N 2/68; B60N 2/005; B60N 2/015; B60N 2/01558; B60N 2/01575
See application file for complete search history.

(56) References Cited

U.S. PATENT DOCUMENTS

2004/0195888 A1* 10/2004 Frye ................. B60N 2/3013
297/354.1
2018/0086299 A1* 3/2018 Kalinowski .............. B60N 2/58

FOREIGN PATENT DOCUMENTS

JP 2019085035 A * 6/2019 ............ B60N 2/427

OTHER PUBLICATIONS

Photograph of Chevrolet 2018 Cruze, Airbag Assembly Hooked at RR Wheel Interior Panel, at least as early as Dec. 2019.
Photograph of Chevrolet 2018 Spark, Airbag Assembly Hooked at RR Wheel Interior Panel, at least as early as Dec. 2019.
Photograph of Chevrolet 2018 Sonic, Airbag Assembly Hooked at RR Wheel Interior Panel, at least as early as Dec. 2019.
Photograph of Volkswagen 2018 Golf, Airbag Assembly attached to Clip on RR Floor at least as early as Dec. 2019.
Photograph of Audi 2018 A3, Airbag Assembly attached to Clip on RR Floor, at least as early as Dec. 2019.
Photograph of Toyota 2018 Camry, Airbag Assembly attached via Bolt on on RR Floor, at least as early as Dec. 2019.

* cited by examiner

*Primary Examiner* — James A English
*Assistant Examiner* — Matthew James O'Neill
(74) *Attorney, Agent, or Firm* — Global IP Counselors, LLP (57) ABSTRACT

A vehicle body structure includes an interior side wall, a floor structure and an airbag support member. The interior side wall defines a first door opening. The floor structure at least partially defines a passenger compartment of a vehicle along with the interior side wall. The floor structure defines seat supporting section adjacent to the first door opening. The airbag support member has an upper end and a lower end and an airbag attachment portion. The lower end is attached to the interior side wall at a first location above the floor structure between the first door opening and the seat supporting section, the upper end being attached to the interior side wall structure at a second location above the first location.

18 Claims, 7 Drawing Sheets

VEHICLE BODY STRUCTURE

BACKGROUND

Field of the Invention

The present invention generally relates to a vehicle body structure that includes an airbag assembly. More specifically, the present invention relates to a vehicle body structure that includes an airbag assembly that is installed adjacent to a rear seat assembly.

Background Information

In many areas of the world, passenger vehicles are required to include airbag assemblies.

SUMMARY

One object of the present disclosure is to provide a vehicle with an airbag assembly that is installed in an area between a rear seat assembly and a door opening.

Another object of the present disclosure is to provide a vehicle with an airbag assembly that is fixed to the vehicle at a location coinciding with a seat support member.

Another object of the present invention is to provide an airbag assembly with a support bracket retained in place by a pivot pin of a seat assembly.

In view of the state of the known technology, one aspect of the present disclosure is to provide a vehicle body structure with an interior side wall, a floor structure and an airbag support member. The interior side wall defines a first door opening. The floor structure at least partially defines a passenger compartment of a vehicle along with the interior side wall. The floor structure defines seat supporting section adjacent to the first door opening. The airbag support member has an upper end and a lower end and an airbag attachment portion. The lower end is attached to the interior side wall at a first location above the floor structure between the first door opening and the seat supporting section. The upper end is attached to the interior side wall structure at a second location above the first location.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
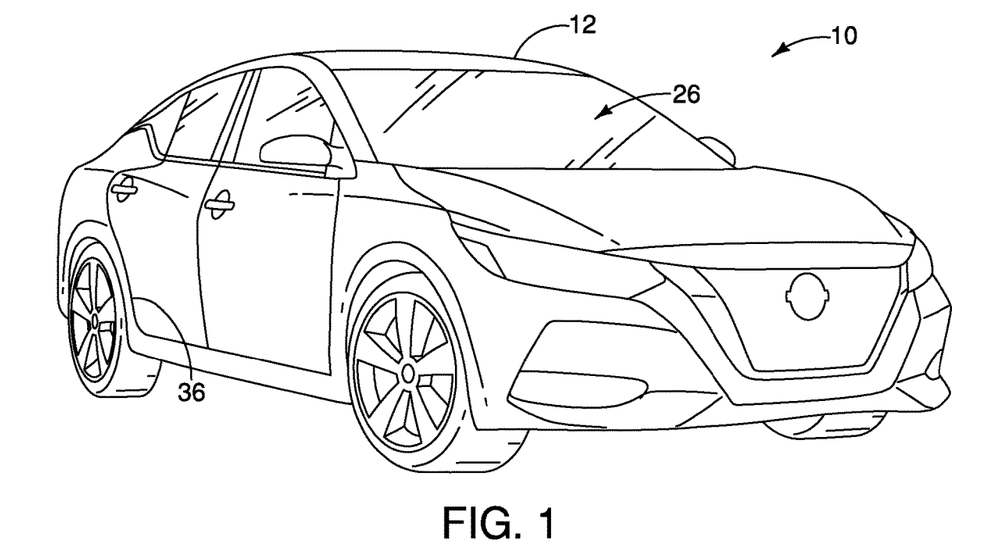
FIG. 1 is a perspective view of a vehicle that includes a vehicle body structure with an airbag assembly installed within a passenger compartment of the vehicle in accordance with one embodiment.
Figure 2:
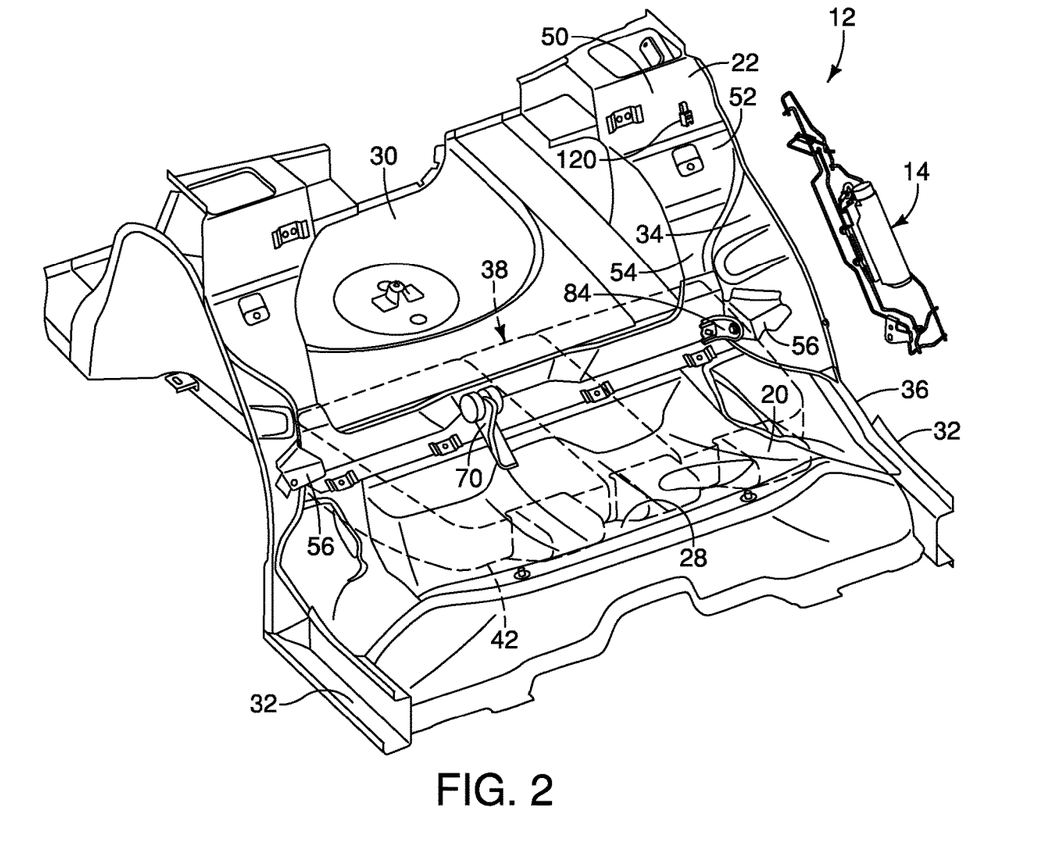
FIG. 2 is an exploded perspective view of a portion of the vehicle body structure showing a floor structure and side walls with the airbag assembly in accordance with the one embodiment.

Referring initially to FIGS. 1 and 2, a vehicle 10 having vehicle body structure 12 that includes an airbag assembly 14 (FIG. 2) is illustrated in accordance with a first embodiment.

Figure 3:
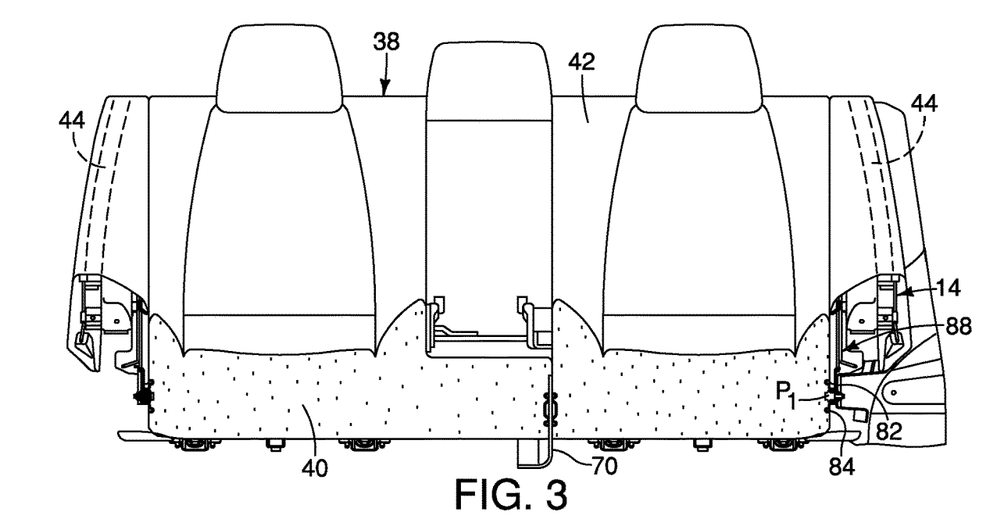
FIG. 3 is a plan view of a portion of the passenger compartment of the vehicle showing a rear seat assembly installed to the floor structure of the vehicle body structure with a partial cutaway of a bolster of the rear seat assembly showing a bracket and pivot pin that retain a lower end of the airbag assembly in accordance with the one embodiment.

As shown in FIGS. 2 and 3, the vehicle body structure 12 of the vehicle 10 includes, among other structures and features, a floor structure 20, side walls 22 and a divider wall 24. The floor structure 20 at least partially defines a passenger compartment 26 that includes a front seat supporting section (not shown), a rear seat supporting section 28 forward of the divider wall 24, and a cargo area 30 rearward of the divider wall 24. The floor structure 20 further defines rear door sills 32. The side walls 22 (also referred to as interior side walls) include wheel wells 34. The divider wall 24 extends in a vehicle lateral direction between the side walls 22 from one side of the passenger compartment 26 to the other side of the passenger compartment 26.

As shown in FIG. 2, the divider wall 24 is located rearward of the rear seat supporting section 28 separating the passenger compartment 26 from the cargo area 30 of the vehicle body structure 12.

Since the side walls 22 are identical (except that they are symmetrical mirror images of one another) only the features at one side of the passenger compartment 26, including a corresponding one of the side walls 22, the rear door sills 32 and the wheel wells 34 are described herein below. However, it should be understood from the drawings and the description herein below that the following description applies equally to both side walls 22, both rear door sills and both wheel wells 34.

The rear door sill 32 and a forward outer periphery of the wheel well 34 at least partially define a rear door opening 36.

The floor structure 20 is configured to support front seats (not shown) and a rear seat assembly 38. As shown in FIG. 3, the rear seat assembly 38 includes a seat cushion portion 40, a seatback portion 42 and bolsters 44 (shown in FIGS. 9 and 10). The seat cushion portion 40 is non-movably attached to the rear seat supporting section 28 of the floor structure 20 in a conventional manner. The seatback portion 42 is configured to pivot between an upright orientation shown in FIG. 3 and a lowered orientation shown in phantom in FIG. 2. The bolsters 44 are located are installed at opposite sides of the rear seat assembly 38. The bolsters 44 are separate from the rear seat assembly 38 and are installed to the vehicle body structure 12 such that the bolsters cover exposed portions of respective ones of the wheel wells 34 covering the airbag assemblies 14.

Figure 4:
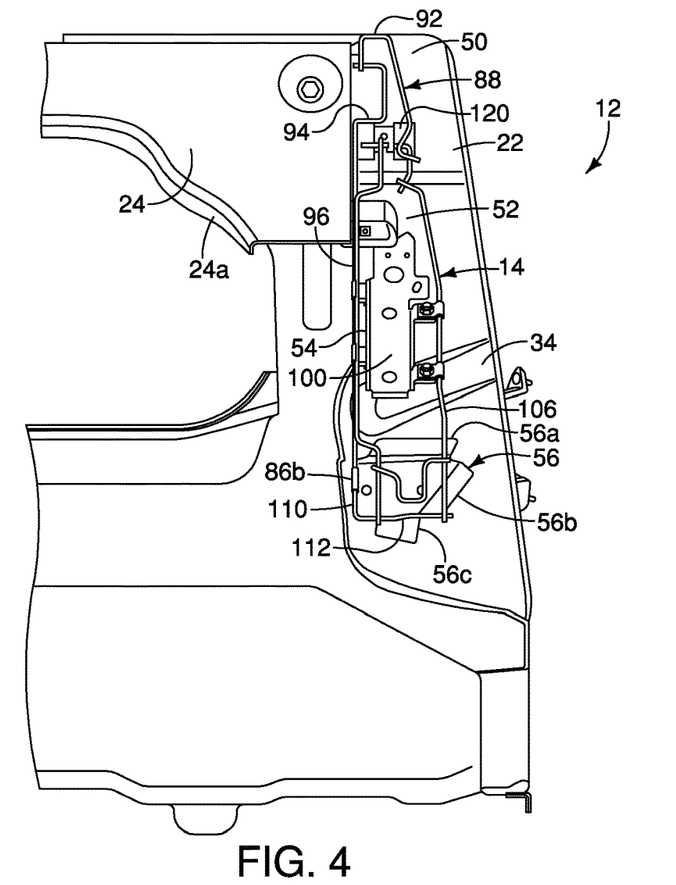
FIG. 4 is another plan view of a portion of the passenger compartment with the rear seat assembly removed showing details of the airbag assembly, the bracket and side wall in accordance with the one embodiment.
Figure 5:
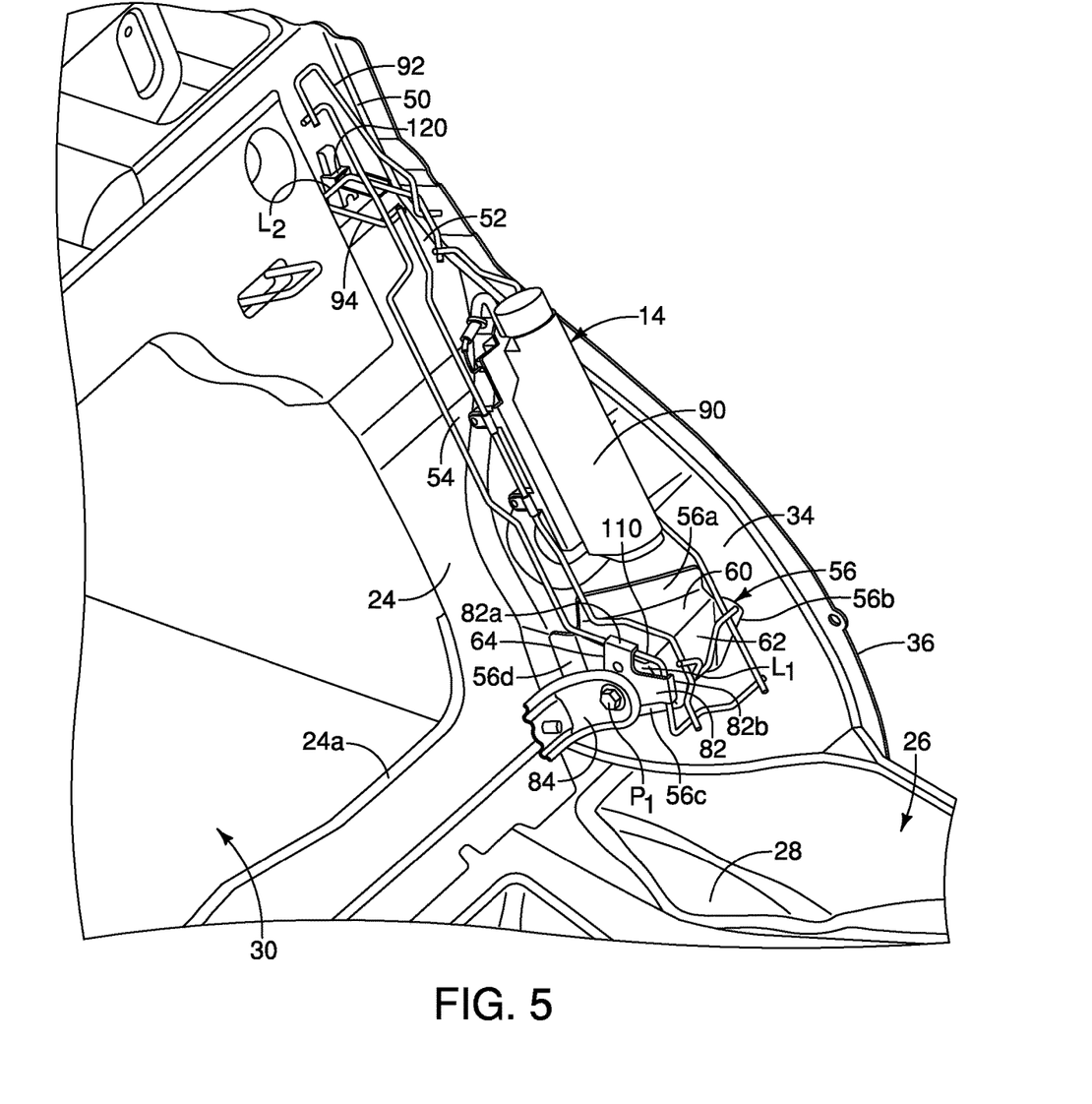
FIG. 5 is a perspective view of the portion of the passenger compartment shown in FIG. 4 with the rear seat assembly removed showing further details of the airbag assembly, the bracket and side wall, including a wheel well and a rear door sill in accordance with the one embodiment.

As shown in FIGS. 2, 4 and 5, the divider wall 24 defines an opening 24a that exposes and provides access between the cargo area 30 and the passenger compartment 26 of the vehicle 10, with a seatback portion 42 of a rear seat assembly 38 in a lowered orientation.

As shown in FIGS. 2-5, the wheel well 34 of the side wall 22 has a curved and contoured shape that covers and conceals a vehicle wheel from view from within the passenger compartment 26. Above the wheel well 34, the side wall 22 includes several surface sections 50, 52 and 54 that are planar or relatively flat, but can be angularly offset from one another. In other words, the surface section 50 is generally flat, but is not co-planar with the surface section 52 or the surface section 54. Similarly, the surface section 52 is generally flat, but is not co-planar with the surface section 54. Further, the surface section 52 can be angularly offset from the surface section 54, as shown in FIGS. 2 and 5.

The surface sections 50, 52 and 54 are upright surfaces of the side wall 22 (also referred to as the interior side wall). The surface sections 50, 52 and 54 and the surface of the wheel well 34 below the surface section 54 are inclined relative to horizontal (not vertical).

As used herein, the term upright surfaces can mean vertically oriented, but also includes surfaces that are neither horizontal nor vertical but are inclined relative to both vertical and horizontal directions.

The lower area of the side surface 22 that defines the wheel well 34 having the curved and contoured shape includes a bracket 56 that is welded thereto, as shown in FIGS. 2, 4, 5 and 6. The bracket 56 includes gussets 56a, 56b, 56c and 56d (FIG. 5 only) that are each welded to the adjacent, surface section of the wheel well 34 of the side wall 22. The bracket 56 also includes a top wall 60, a front wall 62, an inboard wall 64 and a bottom wall 66. The gusset 56a extends upward from a rearward portion of the top wall 60. The gusset 56b extends outboard from the front wall 62. The gusset 56c extends downward from the inboard wall 64 and the bottom wall 66 of the bracket 56. The bracket 56 is also referred to herein below as a seat supporting bracket 56.

The top wall 60 is horizontally oriented with the vehicle 10 on level ground. The inboard wall 64 is vertically oriented and extends downward from the top wall 60. The bracket 56 is a rigid structure that is rigidly and non-movably attached to the side wall 22 at the wheel well 34. The bracket 56 (the seat supporting bracket) includes a pivot pin Pi that extends through the inboard wall 64. The pivot pin Pi is also referred to as a seat hinge pin Pi.

A pivot pin supporting bracket 70 is fixedly attached to the rear seat supporting section 28 of the floor structure 20 at a predetermined location between the side walls 22, as shown in FIGS. 2 and 3. The pivot pin supporting bracket 70 includes pivot pins (not shown) that in turn support the rear seatback portion 42 of the seat assembly 38 for movement between the upright orientation and the lowered orientation.

The seatback portion 42 is supported by the pivot pins (not shown) fixed to the pivot pin supporting bracket 70 and the pivot pin Pi for pivoting movement between the upright orientation and the lowered orientation, as is described in greater detail below.

Figure 7:
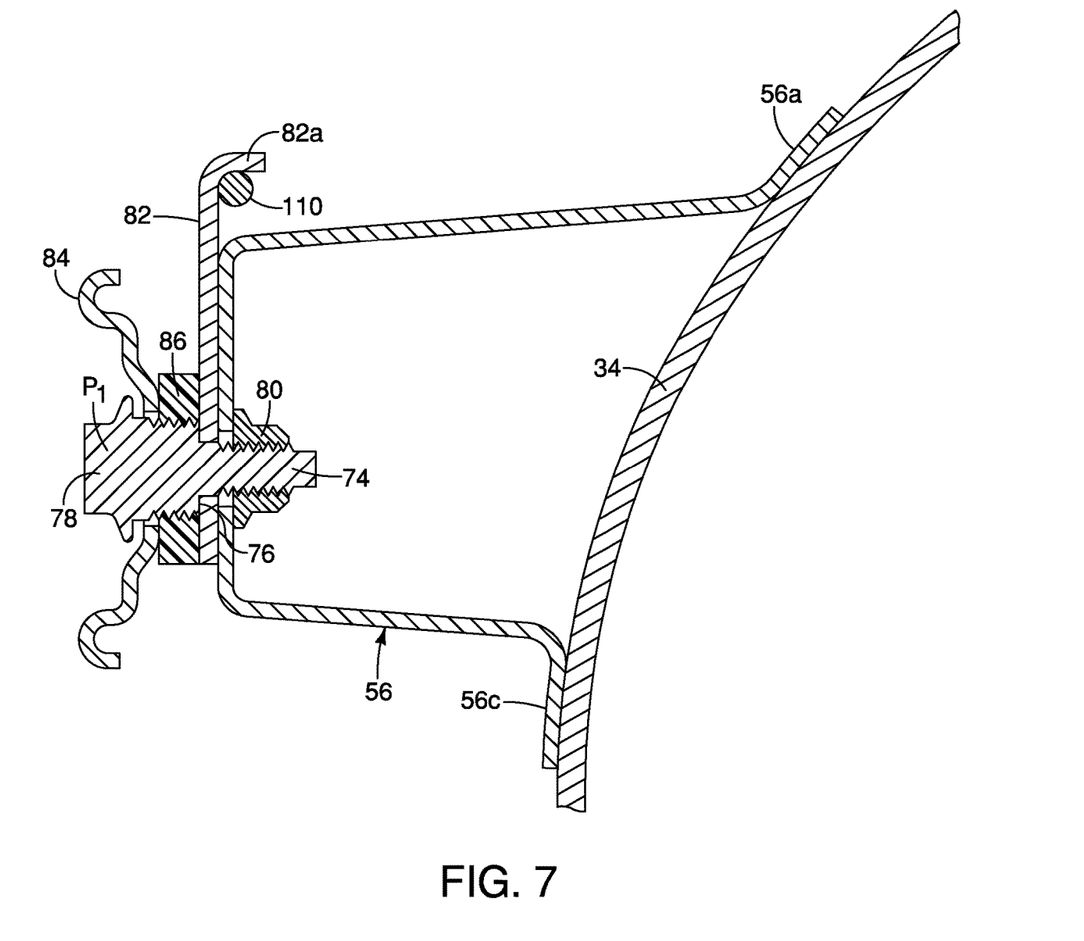
FIG. 7 is a cross-sectional view of a portion of the wheel well, the bracket, the pivot pin and a portion of the rear seat that pivots about the pivot pin in accordance with the one embodiment.

As shown in FIG. 7, the pivot pin Pi includes a threaded portion 74, a shoulder portion 76, and a head portion 78. The threaded portion 80 of the pivot pin Pi is installed to a fixed threaded nut 80 that is fixedly attached to an outboard surface of the inboard wall 64 of the bracket 56. A frame supporting bracket 80 is fixedly attached to the bracket 56 (the seat supporting bracket) by the pivot pin Pi (the seat hinge pin). Specifically, the threaded portion 74 extends through an opening in the frame supporting bracket 80 and threads into the fixed threated nut 80. The shoulder portion 76 clamps the frame supporting bracket 82 between the shoulder portion 76 and the inboard wall 64 of the bracket 56.

Figure 6:
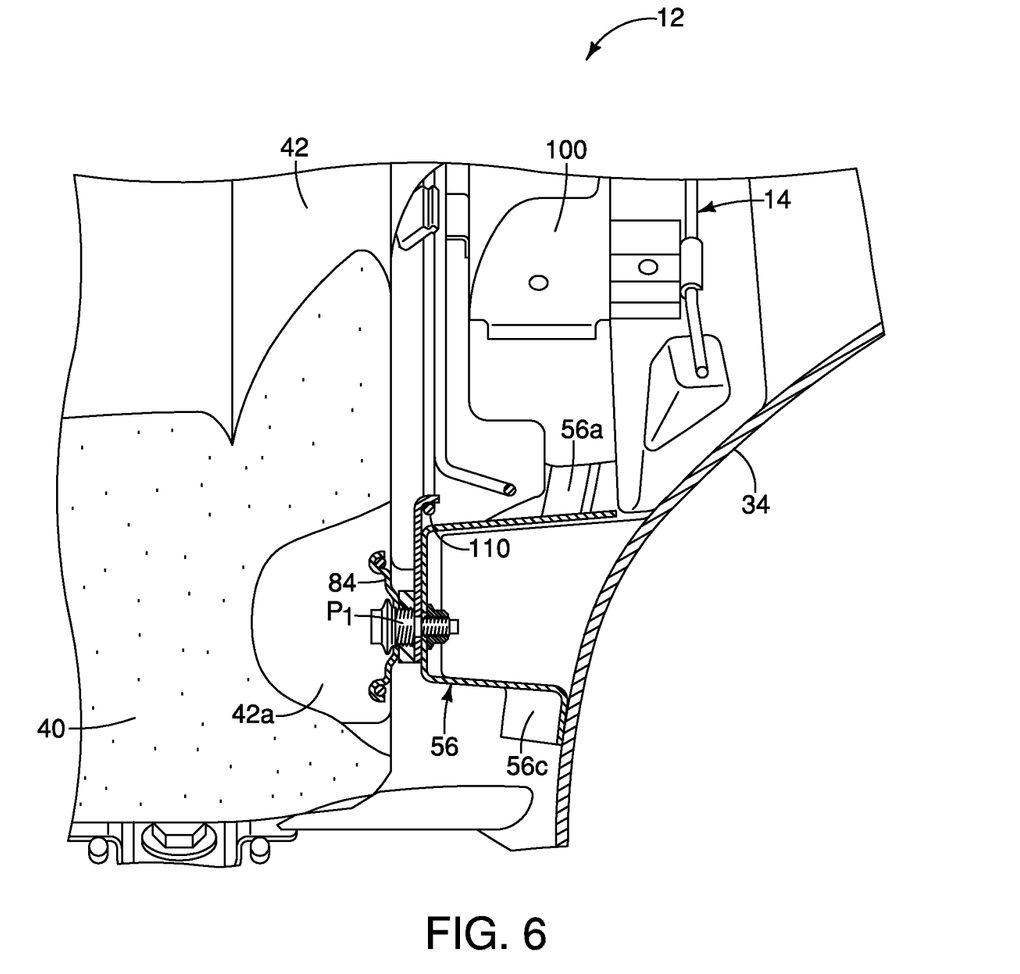
FIG. 6 is a plan view of the portion of the passenger compartment showing further details of the airbag assembly, the bracket and side wall in accordance with the one embodiment.

A seat supporting bracket 84 is supported by the pivot pin Pi for pivotal movement about the pivot pin Pi. The seat supporting bracket 84 is attached to and supports the seatback portion 42, as shown in FIG. 6. Specifically, the seat supporting bracket 84 is fixedly attached to the seatback portion 42 in a conventional manner.

The shoulder portion 76 of the pivot pin Pi has an elongated axial length that receives a spacer 86 and the seat supporting bracket 84. The shoulder portion 76 and the spacer 86 are dimensioned such that the seat supporting bracket 84 can freely pivot about the pivot pin Pi, while the spacer 86 limits lateral, side-to-side movement of the seat support bracket 84 along the axial length of the pivot pin Pi. The pivot pin Pi fixedly retains the frame supporting bracket 82 in place. The seat supporting bracket 84 being a structural part of the seatback portion 42, allows pivoting movement of the seatback portion 42 between the upright orientation shown in FIGS. 9 and 10 and a folded down or lowered orientation shown in phantom in FIG. 2.

The frame supporting bracket 82 includes a first attachment flange 82a and a second attachment flange 82b that is spaced apart from the first attachment flange 82a. The first attachment flange 82a and the second attachment flange 82b are angularly offset from one another by an angle that can be anywhere between 75 and 105 degrees relative to the seat hinge pin Pi. In the depicted embodiment, the first attachment flange 82a and the second attachment flange 82b are angularly offset from one another by an angle that is between 80 and 85 degrees relative to the seat hinge pin Pi.

Figure 8:
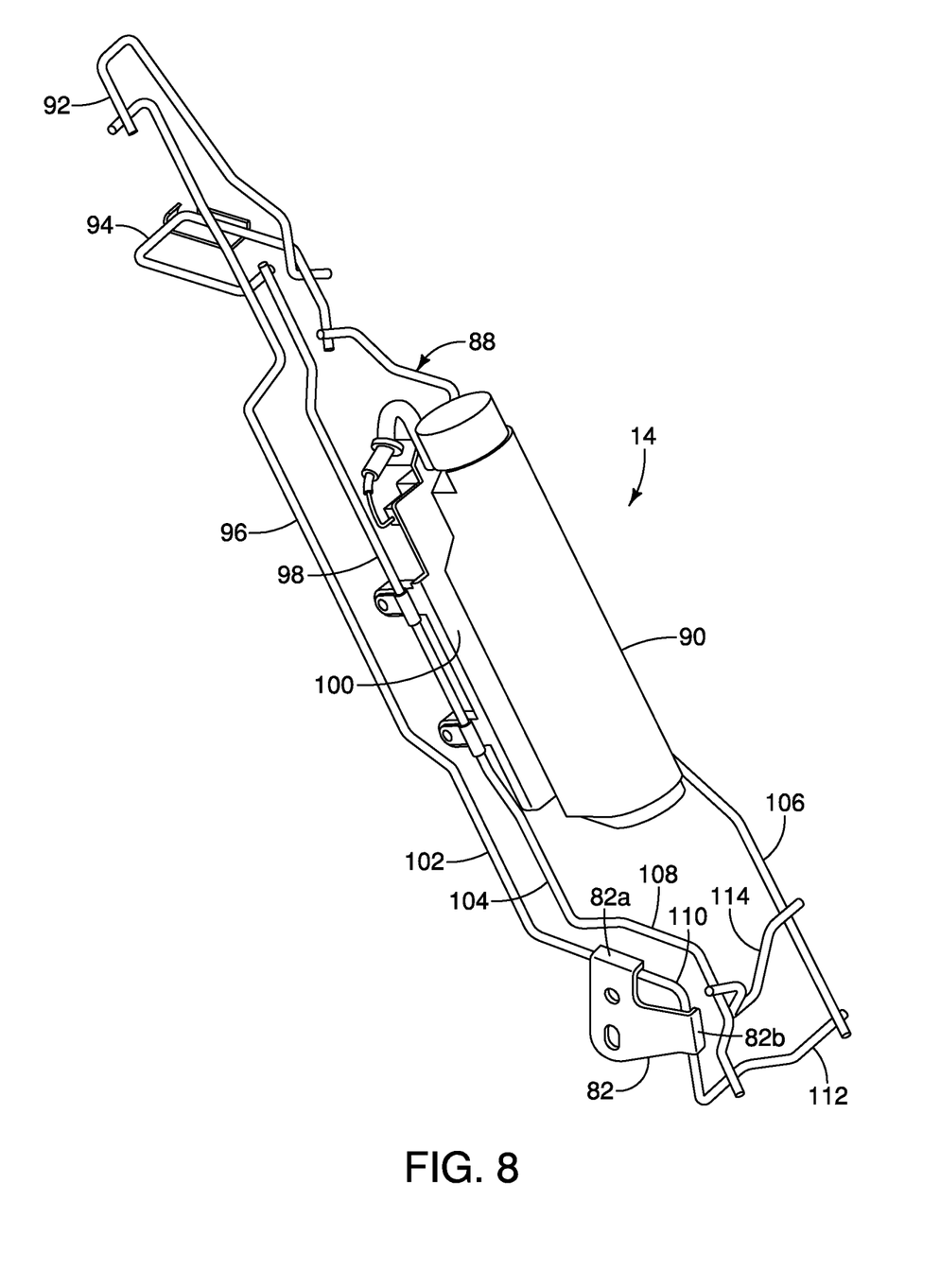
FIG. 8 is a perspective view of the airbag assembly shown removed from the vehicle body structure in accordance with the one embodiment.

A description of the airbag assembly 14 is now provided with specific reference to FIGS. 5 and 8. The airbag assembly 14 includes a frame assembly 88 and an airbag 90. The frame assembly 88 is also referred to herein below as an airbag support member 88. The frame assembly 88 can be made of any of a variety of materials, such as metallic panels or metallic heavy gauge wire-like material. In the depicted embodiment, to minimize weight and for simplicity in manufacturing, the frame assembly 88 is made of a heavy gauge wire or wire-like material. As shown in FIGS. 5 and 8, the frame assembly 88 includes a first upper end portion 92, a second upper end portion 94, a first inclined portion 96, a second inclined portion 98, an airbag attachment portion 100, a first mid-portion 102, a second mid-portion 104, a third mid-portion 106, a first lower portion 108, a second lower portion 110, a third lower portion 112 and a lower leg portion 114.

The frame assembly 88 can be manufactured from a single wire that is deformed or bent to define the shapes depicted in FIG. 8, or can be manufactured from a plurality or wire sections that are welded together to form the various portions of the frame assembly 88. The wire or wire-like material is of a sufficient gauge that provides the strength and rigidity required to withstand the force of an airbag deployment.

The first and second upper end portions 92 and 94 basically define an upper end of the frame assembly 88. The first, second and third lower portions 108, 110, 112 and 114 basically define a lower end of the frame assembly 88. The lower end (portions 108, 110 and 112) are attached to the side wall 22 at a first location $L_1$ corresponding to a lower area of the wheel well 34 and that is above the sill 32. The upper end (portions 92 and 94) are attached to the side wall 22 at a second location $L_2$ above the first location $L_1$ and the wheel well 34.

The first location $L_1$ corresponds at least in part to the frame supporting bracket 82. Specifically, the second lower portion 110 is bent such that its shape conforms to the angular offset between the first attachment flange 82a and the second attachment flange 82b of the frame supporting bracket 82. Further, the second lower portion 110 of the frame assembly 88 is welded or otherwise rigidly fixed to the first attachment flange 82a and the second attachment flange 82b of the frame supporting bracket 82. Since the frame supporting bracket 82 is fixed to the bracket 56 by the pivot pin Pi, the lower end of the frame assembly 88 is also rigidly fixed to the side wall 22 along a lower area of the wheel well 34.

The second location $L_2$ includes a clamp or bracket 120 that rigidly fixes the portions 92 and 94 of the frame assembly 88 to an upper area of the side wall 22 along the surface section 50, above the wheel well 34.

As shown in FIG. 5, with the airbag assembly 14 fully installed to the vehicle body structure 12, the first upper end portion 92 overlays and contacts the surface section 50 of the side wall 22 adjacent to and above the bracket 120. The installation of the bracket 120 fixing the upper end of the frame assembly 88 to the side wall 22 can further cause the fixed upper portion 92 to be pressed against the surface section 50. The pressing force can reduce or eliminate the possibility of any rattling noise from the contact therebetween. The first inclined portion 96 extends downward from the upper end of the frame assembly 88 overlaying and contacting the surface section 52 of the side wall 22, with a lower portion of the first inclined portion 96 being spaced apart from the surface section 54 of the side wall 22. The second inclined portion 96 and the third mid-portion 106 support the airbag attachment portion 100. The airbag attachment portion 100 can be made of wire sections or can be a metal plate with the airbag 90 attached thereto.

The lower leg portion 114 is bent and shaped such that the lower leg portion 114 is pressed against the front wall 62 of the bracket 56. This pressing force can reduce or eliminate the possibility of any rattling noise from the contact therebetween.

Figure 9:
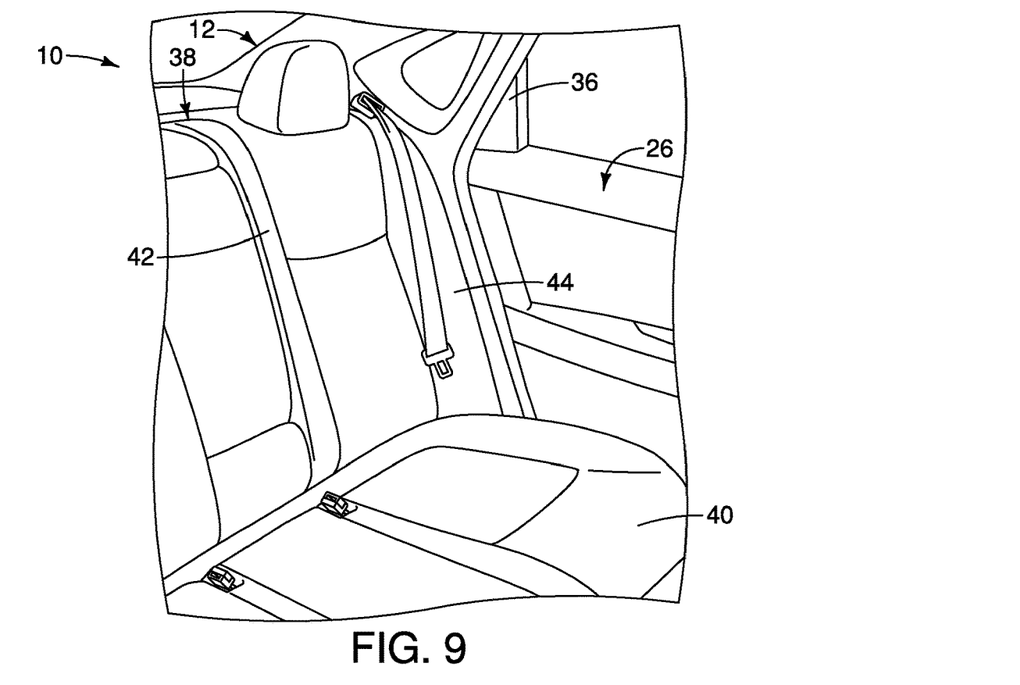
FIG. 9 is a perspective view of the passenger compartment showing the rear seat assembly including the bolster covering the airbag assembly, with the airbag assembly in a stowed orientation in accordance with the one embodiment.

FIG. 9 shows the passenger compartment 26 with seatback portion 42 of the rear seat assembly 38 in the upright orientation. The bolster 44 covers the airbag assembly 14, which is in the stowed orientation.

Figure 10:
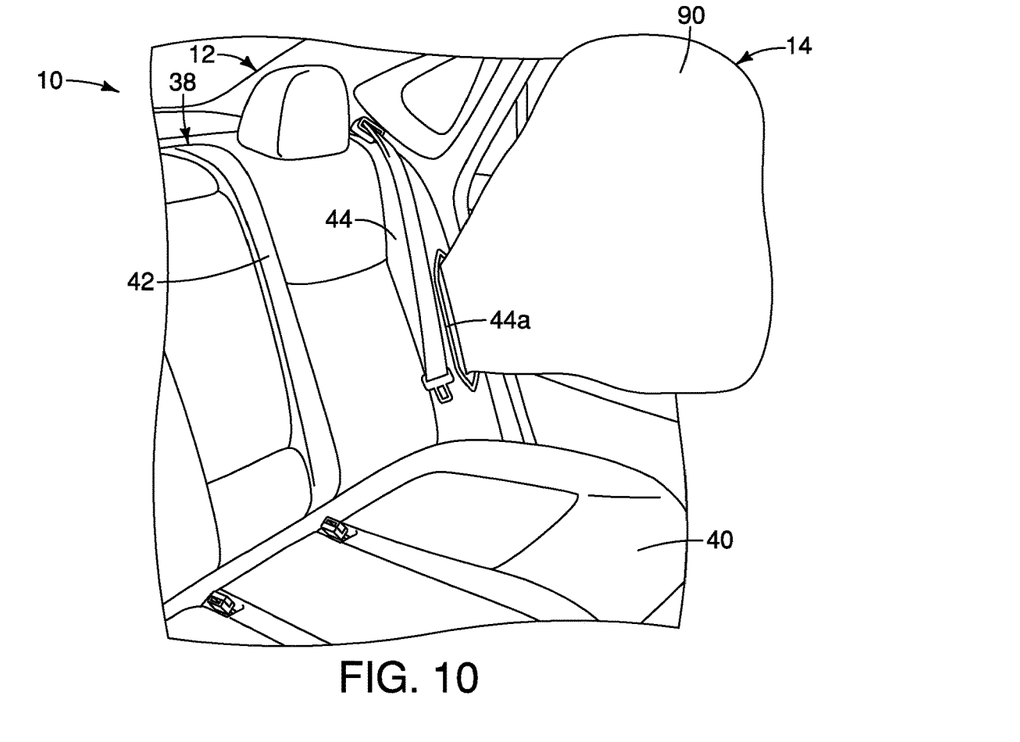
FIG. 10 is another perspective view of the passenger compartment similar to FIG. 9 showing the rear seat assembly and the bolster with the airbag assembly in a deployed orientation in accordance with the one embodiment.

FIG. 10 shows the passenger compartment 26 with the airbag assembly 14 in a deployed orientation. Specifically, when the airbag assembly 14 deploys, the airbag 90 rapidly expands, splitting the bolster 44 and at least partially covering the rear door opening 36.

During deployment of the airbag 90, the actual deployment process can generate forces that act on the frame assembly 88. Those forces are transmitted through the frame assembly 88 to the surfaces of the side wall 22 and wheel well 34 that support the frame assembly 88. Consequently, the frame assembly 88 is designed and manufactured to receive such deployment forces and distribute those forces to the side wall 22 and wheel well 34.

It should be understood from the drawings and the description herein that the airbag 90 includes a controller (not shown) and sensor or sensors (not shown) that detect rapid changes in vehicle conditions such as rapid changes in acceleration and/or deceleration, or impact detection. The controller is a conventional electronic device that can includes a microcomputer with an airbag control program that controls the operation of the airbag 90. Since airbag controllers are conventional features of a vehicle, further description is omitted for the sake of brevity.

It should be understood from the drawings and description herein that the frame assembly 88 is not limited to the shape and overall configuration of the first upper end portion 92, the second upper end portion 94, the first inclined portion 96, the second inclined portion 98, the airbag attachment portion 100, the first mid-portion 102, the second mid-portion 104, the third mid-portion 106, the first lower portion 108, the second lower portion 110, the third lower portion 112 and the lower leg portion 114. Other combinations of wire configurations are within the scope of this disclosure. The frame supporting bracket 82 serves one of two primary support structures for the frame assembly 88 and is spaced apart and above the rear door sill 32. The pivot pin Pi and the bracket 56 are configured to support the frame assembly 88 (and the airbag assembly 14) as well as receive and counteract the deployment forces at the first location $L_1$. The first location $L_1$ is along the wheel well 34. However, it should be understood from the drawings and the description herein that in a vehicle with a different wheel base, the wheel well 34 can be located rearward and spaced apart from the side wall 22. Hence, the first location $L_1$ can be positioned at a lower end of the side wall 22, and not be located along a portion of the wheel well 34.

The vehicle 10 includes many conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure, comprising:
    an interior side wall defining a first door opening, the interior side wall including a seat supporting bracket installed to the interior side wall at the first location, the seat supporting bracket having a seat hinge pin extending therethrough;
    a floor structure at least partially defining a passenger compartment of a vehicle along with the interior side wall, the floor structure defining seat supporting section adjacent to the first door opening; and
    an airbag support member having an upper end and a lower end and an airbag attachment portion, the lower end being attached to the interior side wall at a first location above the floor structure between the first door opening and the seat supporting section, the upper end being attached to the interior side wall structure at a second location above the first location, and
    a portion of a vehicle seat is pivotally supported by the seat hinge pin.

2. The vehicle body structure according to claim 1, wherein
    the first location and the second location are defined on an upright surface of the interior side wall.

3. The vehicle body structure according to claim 2, wherein
    the upright surface of the interior side wall is inclined relative to horizontal.

4. The vehicle body structure according to claim 2, wherein
    the upright surface of the interior side wall is located along a wheel well section of the interior side wall.

5. The vehicle body structure according to claim 1, wherein
    the seat supporting bracket is welded to the interior side wall.

6. The vehicle body structure according to claim 1, further comprising
    a frame supporting bracket fixedly attached to the seat supporting bracket by the seat hinge pin.

7. The vehicle body structure according to claim 6, wherein
    the frame supporting bracket includes a first attachment flange and a second attachment flange spaced apart from the first attachment flange.

8. The vehicle body structure according to claim 7, wherein
    the first attachment flange and the second attachment flange are angularly offset from one another by between 75 and 105 degrees relative to the seat hinge pin.

9. The vehicle body structure according to claim 8, wherein
    the first attachment flange and the second attachment flange are angularly offset from one another by between 80 and 85 degrees relative to the seat hinge pin.

10. The vehicle body structure according to claim 6, wherein
    the airbag support member includes a rigid wire frame that defines the upper end, the lower end and the airbag attachment portion, the lower end being fixed to the frame supporting bracket.

11. The vehicle body structure according to claim 10, wherein
    the lower end of the rigid wire frame includes a first wire section and a second wire section that are angularly offset from one another by an angle of between 80 and 110 degrees.

12. The vehicle body structure according to claim 11, wherein
    the frame supporting bracket includes a first attachment flange and a second attachment flange spaced apart from and angularly offset from the first attachment flange relative to the seat hinge pin, the first wire section being fixed to the first attachment flange and the second wire section being fixed to the second attachment flange.

13. The vehicle body structure according to claim 1, wherein
    the portion of the vehicle seat is a seatback portion of the vehicle seat movable between an upright orientation and a lowered orientation, the vehicle seat also including a cushion portion that is fixedly attached to the seat supporting section.

14. The vehicle body structure according to claim 13, further comprising
    a divider wall that extends in a vehicle lateral direction from the interior side wall, the divider wall being rearward of the seat supporting section separating the passenger compartment from a cargo area of the vehicle body structure.

15. The vehicle body structure according to claim 14, further comprising
    the divider wall defines an opening that exposes the cargo area of the vehicle with the seatback portion of the vehicle seat in the lowered orientation.

16. The vehicle body structure according to claim 1, wherein
    the seat supporting section of the floor structure includes a front seat supporting section and a rear seat supporting section, and, the first door opening being a rear door opening.

17. The vehicle body structure according to claim 16, wherein the side wall structure includes a wheel well and a door sill that extends forward from the wheel well, the door sill at least partially defines the rear door opening.

18. The vehicle body structure according to claim 17, wherein
the first location and the second location are located on an interior surface of the wheel well vertically higher than the door sill.

\* \* \* \* \*